US012656658B2

(12) United States Patent
Nakatogawa et al.

(10) Patent No.: US 12,656,658 B2
(45) Date of Patent: Jun. 16, 2026

(54) CAMERA MODULE

(71) Applicant: Magnolia White Corporation, Tokyo (JP)

(72) Inventors: Hirondo Nakatogawa, Tokyo (JP); Yoshiro Aoki, Tokyo (JP); Hitoshi Tanaka, Tokyo (JP)

(73) Assignee: Magnolia White Corporation, Tokyo (JP)

(*) Notice: Subject to any disclaimer, the term of this patent is extended or adjusted under 35 U.S.C. 154(b) by 0 days.

(21) Appl. No.: 18/898,776

(22) Filed: Sep. 27, 2024

(65) Prior Publication Data

US 2025/0020976 A1     Jan. 16, 2025

Related U.S. Application Data

(63) Continuation of application No. PCT/JP2023/005442, filed on Feb. 16, 2023.

(30) Foreign Application Priority Data

Mar. 30, 2022    (JP) ................................. 2022-056356

(51) Int. Cl.
*G03B 9/02* (2021.01)
*G02F 1/1333* (2006.01)
(Continued)

(52) U.S. Cl.
CPC ......... *G03B 9/02* (2013.01); *G02F 1/133388* (2021.01); *G02F 1/134309* (2013.01); *G02F 1/13458* (2013.01)

(58) Field of Classification Search
CPC ......... G02F 1/133388; G02F 1/134309; G02F 1/13458; G03B 9/02
See application file for complete search history.

(56) References Cited

U.S. PATENT DOCUMENTS

| | | |
|---|---|---|
| 2018/0166489 A1 | 6/2018 | Sao et al. |
| 2018/0228037 A1 | 8/2018 | Fujikawa |
| 2023/0221601 A1 | 7/2023 | Aoki et al. |

FOREIGN PATENT DOCUMENTS

| | | |
|---|---|---|
| EP | 2667244 A1 | 11/2013 |
| JP | 2006-309011 A | 11/2006 |

(Continued)

OTHER PUBLICATIONS

PE2E english translation of TW202129375A (Year: 2021).*

(Continued)

*Primary Examiner* — David Y Chung

(74) *Attorney, Agent, or Firm* — Michael Best & Friedrich LLP

(57) ABSTRACT

According to one embodiment, a camera module includes an image sensor and a liquid crystal panel. The liquid crystal panel includes an aperture portion in which first and second regions are formed, a liquid crystal layer disposed in a position overlapping the aperture portion, a first electrode disposed in a position overlapping the first region and a second electrode disposed in a position overlapping the second region, a driver which drives the liquid crystal layer, a non-aperture portion which surrounds the aperture portion, a first pad that electrically connects the first electrode to the driver and a second pad that electrically connects the second electrode to the driver.

2 Claims, 7 Drawing Sheets

(51) Int. Cl.
_G02F 1/1343_ (2006.01)
_G02F 1/1345_ (2006.01)

(56) References Cited

FOREIGN PATENT DOCUMENTS

| JP | 2018-17792 A | | 2/2018 |
| JP | 2018-128487 A | | 8/2018 |
| TW | 202129375 A | * | 8/2021 |

OTHER PUBLICATIONS

International Search Report mailed on May 9, 2023 for the corresponding PCT Application No. PCT/JP2023/005442, with English machine translation.
Japanese Office Action mailed on Aug. 5, 2025, for the corresponding Japanese Patent Application No. 2024-511404, with English machine translation.

* cited by examiner

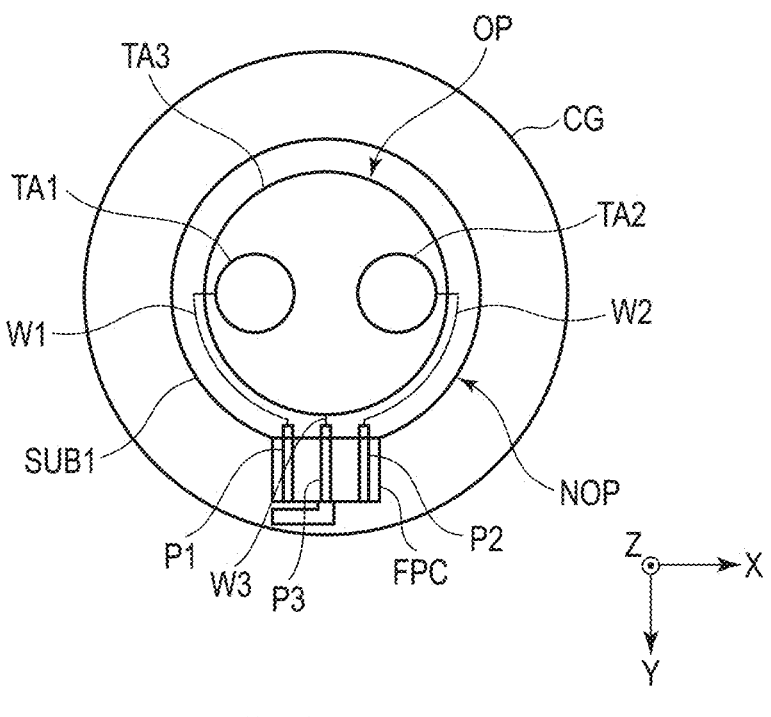
F I G. 10
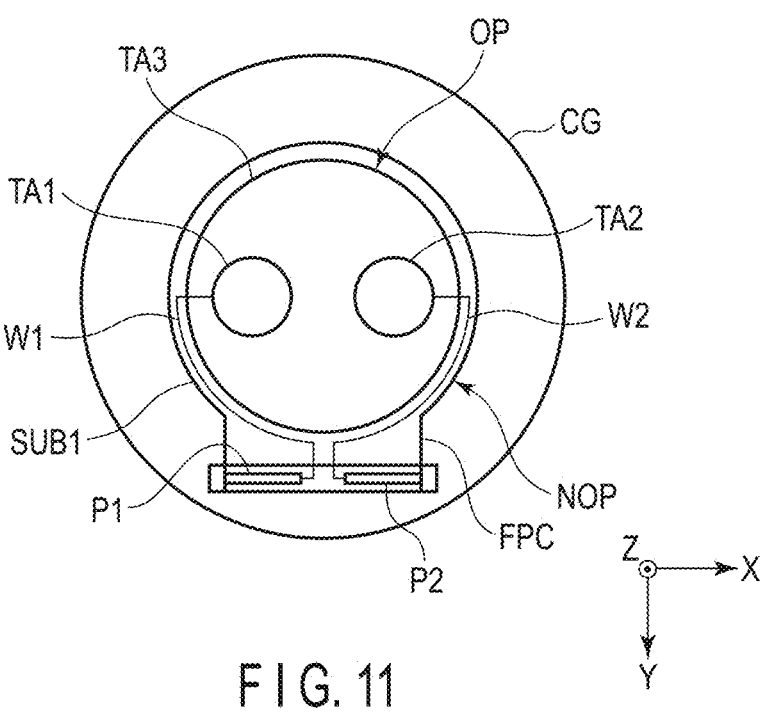
F I G. 11

CAMERA MODULE

CROSS-REFERENCE TO RELATED APPLICATIONS

This application is a Continuation Application of PCT Application No. PCT/JP2023/005442, filed Feb. 16, 2023 and based upon and claiming the benefit of priority from Japanese Patent Application No. 2022-056356, filed Mar. 30, 2022, the entire contents of all of which are incorporated herein by reference.

FIELD

Embodiments described herein relate generally to a camera module.

BACKGROUND

In recent years, a camera module including a liquid crystal panel, and an image sensor located on the rear surface of the liquid crystal panel has been developed.

In connection with such a camera module, a coded-aperture technology is known for calculating a distance from the camera module to a subject in an image by using a blur caused in the image generated based on light incident upon the image sensor equipped therein.

But, when an image sensor located on the rear surface of the liquid crystal panel as described above, it is necessary to ensure light entering the image sensor element by driving the display panel.

BRIEF DESCRIPTION OF THE DRAWINGS

FIG. 10 is a diagram illustrating an example of a configuration that changes the shape of a flexible circuit board.

FIG. 11 is a plan view schematically showing an example of a camera module according to the second embodiment.

DETAILED DESCRIPTION

Figure 1:
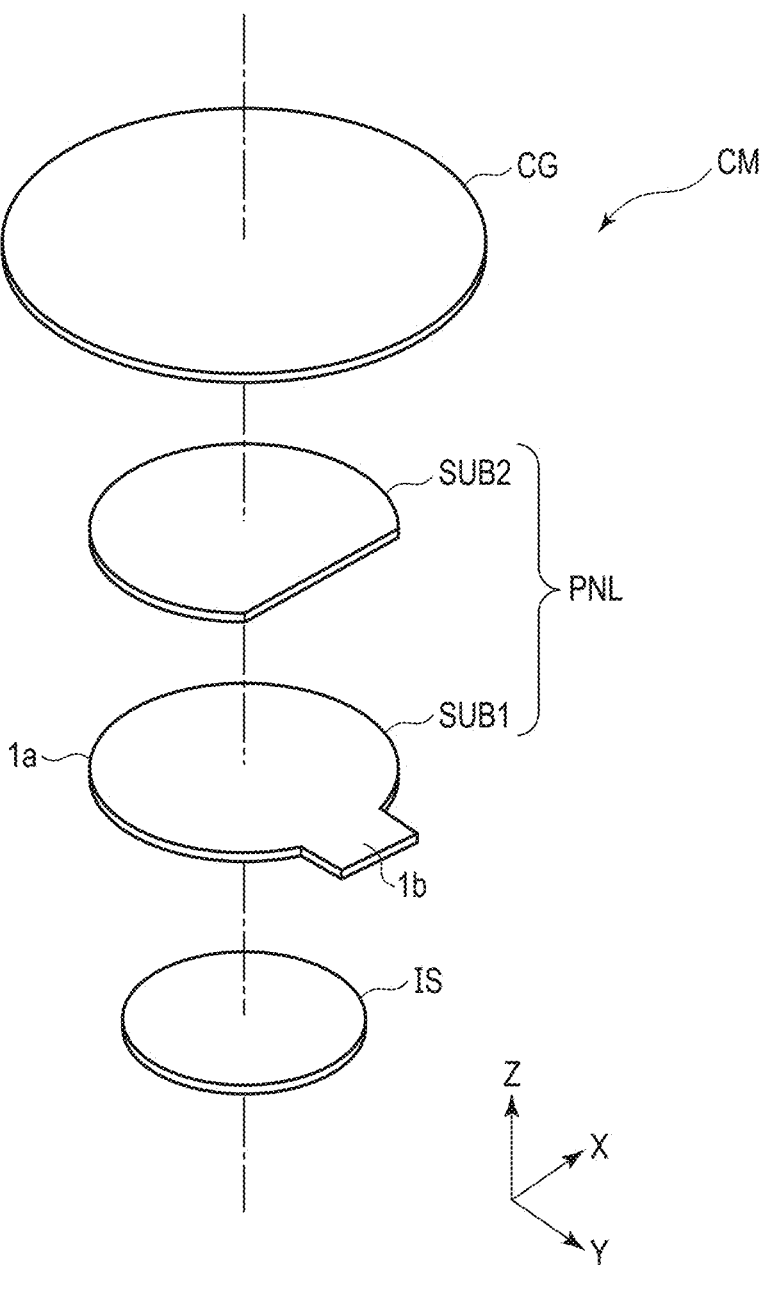
FIG. 1 is an exploded perspective view showing an example of a configuration of a camera module according to the first embodiment.

In general, according to one embodiment, a camera module includes an image sensor and a liquid crystal panel. The liquid crystal panel includes an aperture portion in which first and second regions are formed to be disposed in positions to allow light to enter the image sensor, a liquid crystal layer disposed in a position overlapping the aperture portion, a first electrode disposed in a position overlapping the first region and a second electrode disposed in a position overlapping the second region, a driver which drives the liquid crystal layer by applying a voltage to each of the first and second electrodes, a non-aperture portion which surrounds the aperture portion, a first pad that electrically connects the first electrode to the driver and a second pad that electrically connects the second electrode to the driver. The first and second pads are disposed in a position overlapping the non-aperture portion.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

FIG. 1 is an exploded perspective view of an example of a configuration of a camera module according to this embodiment. FIG. 1 shows a three-dimensional space defined by a direction X, a direction Y perpendicular to the direction X, and a direction z perpendicular to the direction X and the direction Y. The direction X, direction Y, and direction Z are orthogonal to each other, but may intersect at angles other than 90°. Further, in this embodiment, the direction Z is defined as up, and the direction opposite to the direction Z is defined as down. With such expressions "a second member above a first member" and "a second member below a first member", the second member may be in contact with the first member or may be remote from the first member.

As shown in FIG. 1, a camera module CM includes a liquid crystal panel PNL, which is covered by a cover glass CG as a cover member, and an image sensor IS provided on a lower (rear surface) side of the liquid crystal panel PNL.

The liquid crystal panel PNL includes an array substrate SUB1 and a counter substrate SUB2. The array substrate SUB1 has a keyhole shape (contour), which is a combination of a first portion 1a having approximately a circular shape and a second portion 1b having approximately a rectangular shape connected to the first portion 1a, in a plan view in which the camera module CM is viewed from the direction Z. On the other hand, the counter substrate SUB2 has such a shape that the second portion 1b of the array substrate SUB1 is exposed in plan view when placed in a position overlapping the first portion 1a of the array substrate SUB1.

Although not shown in FIG. 1, the liquid crystal panel PNL further includes a liquid crystal layer held between the array substrate SUB1 and the counter substrate SUB2.

The image sensor IS, together with an optical system including at least one lens not shown in the figure, constitutes a camera for capturing images.

In the camera module CM of this embodiment, the liquid crystal layer provided in the liquid crystal panel PNL described above is driven, and thus light transmitted through the cover glass CG and the liquid crystal panel PNL (liquid crystal layer) is made incident on the image sensor IS. With this configuration, the camera module CM can capture an image based on the light incident on the image sensor IS.

FIG. 1 is a diagram illustrating the relationship in terms of position between the cover glass CG, the liquid crystal panel PNL (the array substrate SUB1 and the counter substrate SUB2), and the image sensor IS (camera) in the direction Z. The sizes and shapes of the cover glass CG, the liquid crystal panel PNL, and the image sensor IS are shown in a simplified manner in FIG. 1.

Figure 2:
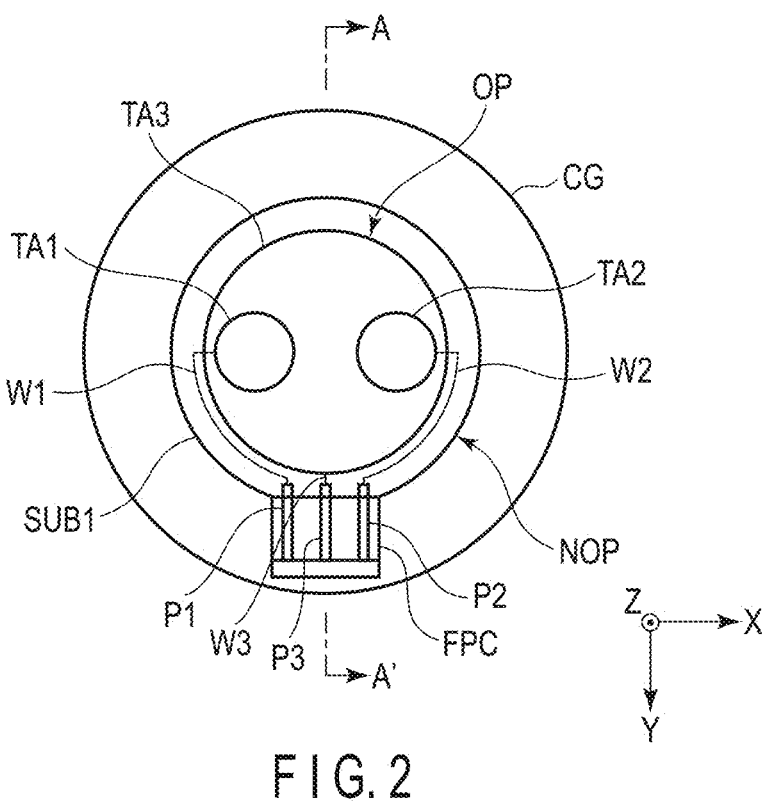
FIG. 2 is a plan view schematically showing an example of a camera module.

FIG. 2 is a plan view schematically showing the camera module CM. In FIG. 2, only the cover glass CG and the array substrate SUB1 are shown for convenience, but the counter substrate SUB2 is disposed between the cover glass CG and the array substrate SUB1. Further, on the rear surface side of the array substrate SUB1 (in a direction opposite to the direction Z), the image sensor IS is disposed.

The liquid crystal panel PNL has an aperture portion OP having, for example, a circular shape. In this embodiment, the aperture portion OP is a portion (region) overlapping the liquid crystal layer held between the array substrate SUB1 and the counter substrate SUB2 described above.

In this embodiment, a plurality of regions are formed in the aperture portion OP. The plurality of regions formed in the aperture portion OP are, for example, regions through which light can be transmitted by driving the liquid crystals, (which will be hereinafter referred to as "light transmitting regions"), and in the example shown in FIG. 2, they include first to third light transmitting regions TA1 to TA3.

The first light transmitting region TA1 has a circular shape and is formed, for example, at a position that does not include the center of the aperture portion OP. Specifically, the first light transmitting region TA1 is formed at a position closer from the center of the aperture portion OP to the opposite direction of the X direction.

The second light transmitting region TA2 has a circular shape and is formed, for example, at a position opposing the first light transmitting region TA1 while interposing the center of the aperture portion OP. More specifically, the second light transmitting region TA2 is formed at a position closer in the X direction with respect to the center of the aperture portion OP.

In the example shown in FIG. 2, the first light transmitting region TA1 and the second light transmitting region TA2 are formed to have approximately the same size.

The third light transmitting region TA3 corresponds to the region of the aperture portion OP excluding the first and second light transmitting regions TA1 and TA2 therefrom.

Note it is assumed here that the first to third light transmitting regions TA1 to TA3 is compartmentalized from each other by a light-shielding region formed by, for example, a black matrix.

Here, in order to make light incident on the image sensor IS as described above, it is necessary to drive the liquid crystal layer by applying voltage to an electrode located at a position corresponding to the liquid crystal layer, (which will be hereinafter referred to as a drive electrode). Note that in this embodiment, the liquid crystal panel PNL is assumed to include a plurality of drive electrodes disposed at positions corresponding to a plurality of light transmitting regions, respectively.

In the example shown in FIG. 2, the liquid crystal panel PNL includes a first drive electrode arranged in a position overlapping the first light transmitting region TA1, a second drive electrode arranged in a position overlapping the second light transmitting region TA2, and a third drive electrode arranged in a position overlapping the third light transmitting region TA3.

According to this configuration, for example, when voltage is applied only to the first drive electrode, the liquid crystal layer can be driven so that light is transmitted to the image sensor IS via the first light transmitting region TA1. Further, for example, when voltage is applied only to the second drive electrode, the liquid crystal layer can be driven so that light is transmitted to the image sensor IS via the second light transmitting region TA2. Similarly, for example, when voltage is applied only to the third drive electrode, the liquid crystal layer can be driven so that light is transmitted to the image sensor IS via the third light transmitting region TA3. Note here, it is assumed that the normally black mode, in which light is transmitted when voltage is applied to the drive electrode (that is, in the on state) is employed in the liquid crystal panel PNL.

Incidentally, in this embodiment, it is assumed here that an image based on light transmitted through each of the first to third light transmitting regions TA1 to TA3 described above and made incident on the image sensor IS (that is, the image of the subject captured by the camera module CM) is utilized, and the camera module CM is used to calculate the distance from the camera module CM (image sensor IS) to the subject in the image, (which will be hereinafter simply referred to as the distance of the subject).

As a technique for calculating the distance of a subject from an image, for example, the coded aperture technique can be used. Although the detailed explanation thereof is omitted, the coded aperture technique is a technique for calculating the distance of a subject by analyzing the blurring that occurs in the image according to the location of the subject.

That is, by using the above-described coded aperture technology, the camera module CM can be used for applications such as calculating the distance of a subject based on an image and creating a depth map that represents the distance of the subject of interest. The process of calculating the distance of a subject and the process of creating a depth map, and the like can be realized, for example, by a predetermined application program to be operated on an electronic device connected to the camera module CM (an electronic device in which the camera module CM is mounted).

Figure 3:
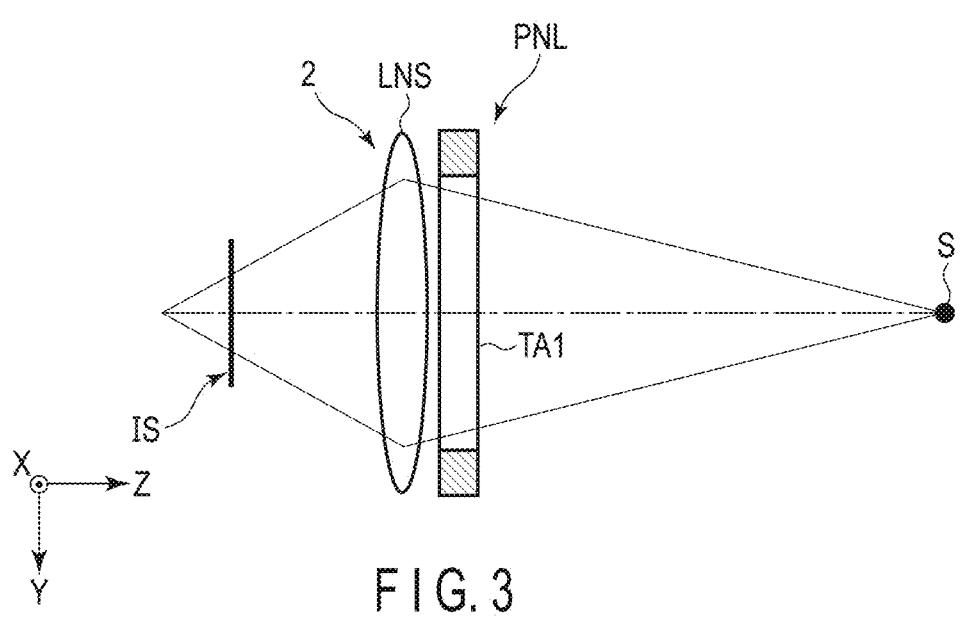
FIG. 3 is a diagram illustrating a principle of calculating a distance from a subject using the camera module.

Here, with reference to FIG. 3, the principle of calculating the distance of a subject using images captured by the camera module CM described above will be briefly explained. FIG. 3 shows the relationship in position between the camera module CM and the subject. Note that although omitted in FIG. 1 described above, a lens LNS is disposed between the image sensor IS and the liquid crystal panel PNL in the camera module CM.

Here, such a case is assumed that the distance of the subject S shown in FIG. 3 is calculated. Generally, in a camera, a subject S is captured in a state in which the subject S is in focus by changing the distance between the lens LNS and the image sensor IS. But when the subject S is captured in an out-of-focus state such as shown in FIG. 3, a misalignment is created between the focal position and the position of the image pickup surface of the image sensor IS, and therefore the image based on the light incident on the image sensor IS is blurred.

According to the coded aperture technique described above, the distance to the subject S is calculated based on the blurring thus created in the image.

Note that FIG. 3 shows the case where light transmits through the first light transmitting region TA1, but in this embodiment, three light transmitting regions (first to third light transmitting regions TA1 to TA3) are prepared as described above, and the distance of the subject is calculated by utilizing multiple images based on light transmitted through each of the three light transmitting regions (that is, multiple blur patterns based on the light transmitted through different light transmitting regions). Thus, the accuracy of the distance can be improved.

Here, in this embodiment, light can be transmitted to the image sensor IS through each of the first to third light transmitting regions TA1 to TA3 by applying a voltage to each of the first to third drive electrodes as described above. Note that, in order to apply the voltage to the first to third drive electrodes in this manner, it is necessary to electrically connect the driver (not shown), which is configured to drive the liquid crystal panel PNL (liquid crystal layer), to the first to third drive electrodes.

In this case, for example, the first drive electrode (that is, the drive electrode located in a position overlapping the first light transmitting region TA1) is electrically connected to a first pad P1 via a first wiring line W1, and the first pad P1 is electrically connected to the driver via the flexible circuit board FPC.

Further, the second drive electrode (that is, the drive electrode located in the position overlapping the second light transmitting region TA2) is electrically connected to a second pad P2 via a second wiring line W2, and the second pad P2 is electrically connected to the driver via the flexible circuit board FPC.

Similarly, the third drive electrode (that is, the drive electrode located in the position overlapping the third light transmitting region TA3) is electrically connected to a third pad P3 via a third wiring line W3, and the third pad P3 is electrically connected to the driver via the flexible circuit board FPC.

For example, outer lead bonding (OLB) pads are used as the first to third pads P1 to P3 described above.

Further, the liquid crystal panel PNL includes a non-aperture portion NOP which surrounds the aperture portion OP, and the first to third pads P1 to P3 are located in the non-aperture portion NOP, as shown in FIG. 2. In the example shown in FIG. 2, the first to third pads P1 to P3 extend along the direction Y and are aligned along the direction X. In this case, the first to third wiring lines W1 to W3 described above are connected to the first to third pads P1 to P3, respectively, by their end portions on an opposite side to the direction Y.

Figure 4:
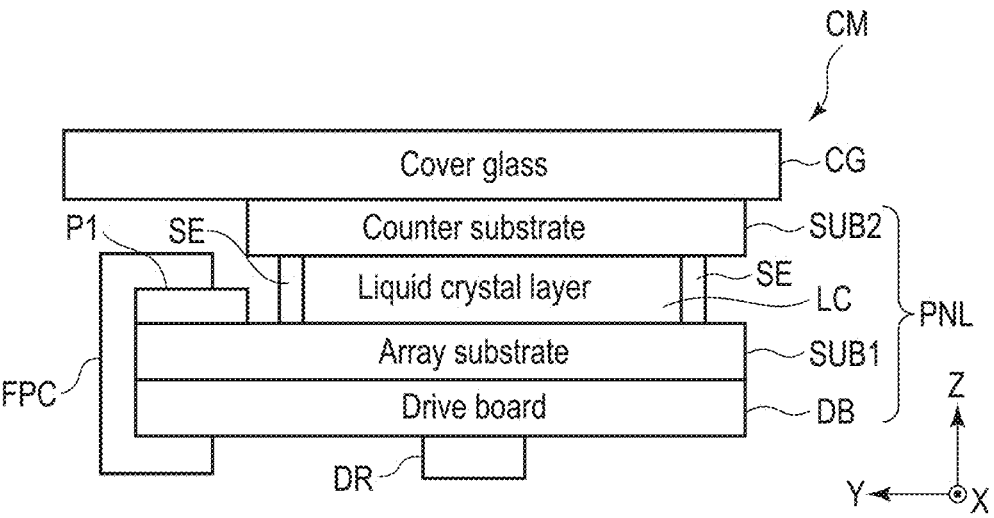
FIG. 4 is a cross-sectional view schematically showing the camera module taken along line A-A' in FIG. 2.

Here, FIG. 4 is a diagram schematically showing a cross-section of the camera module CM, taken along line A-A' shown in FIG. 2. As shown in FIG. 4, the liquid crystal panel PNL includes the array substrate SUB1, the counter substrate SUB2, and the liquid crystal layer LC held between the array substrate SUB1 and the counter substrate SUB2 described above. Further, on a rear surface side of the array substrate SUB1 (opposite side to the direction Z), a drive board DB is disposed.

As shown in FIG. 4, the driver DR that drives the liquid crystal panel PNL (liquid crystal layer LC) is mounted on the drive board DB. The flexible circuit board FPC described above extends along the first to third pads P1 to P3 (that is, in the direction Y), and the first pad P1 shown in FIG. 4 is connected to the driver DR via the flexible circuit board FPC bent at the end portion of a direction Y side of the first pad P1. The first pad P1 and the flexible circuit board FPC can be electrically connected to each other by crimping through an anisotropic conductive film (ACF), for example.

Note that the liquid crystal panel PNL includes a sealing member SE located in the non-aperture portion NOP, and the array substrate SUB1 and the counter substrate SUB2 are joined by the sealing member SE. With this configuration, the liquid crystal layer LC can be formed in the space surrounded by the array substrate SUB1, the counter substrate SUB2 and the sealing material SE.

Further, although omitted in FIG. 4, the image sensor IS is disposed between the array substrate SUB1 and the drive board DB, for example.

Figure 5:
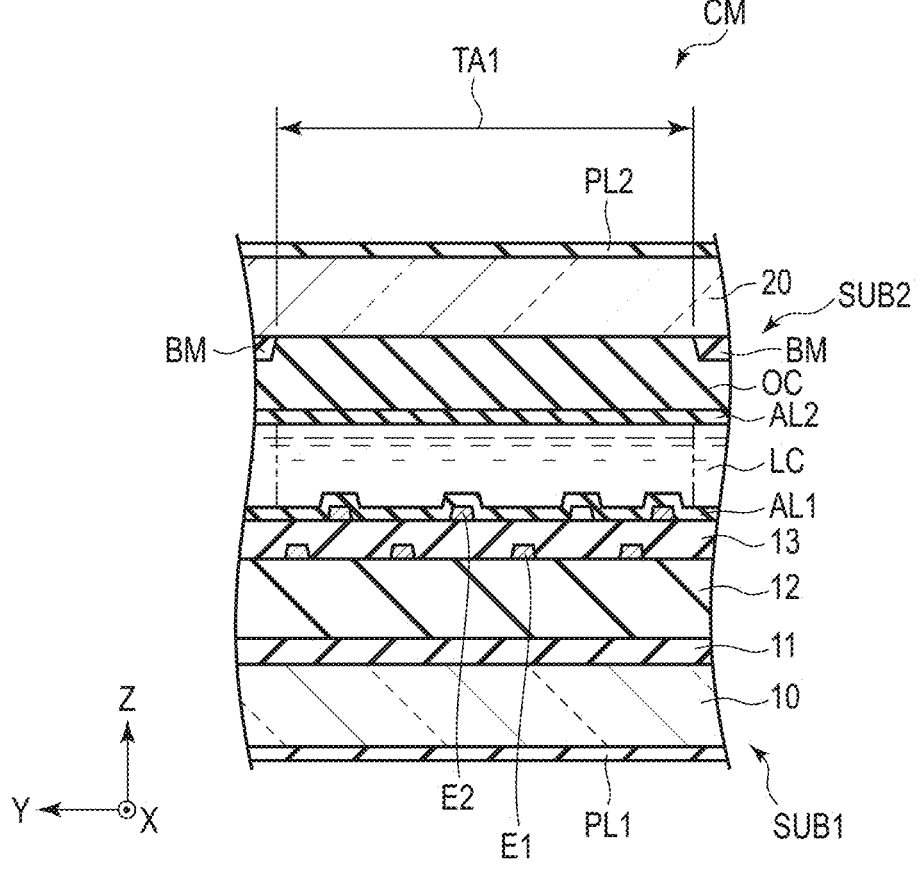
FIG. 5 is a cross-sectional view showing a light transmitting region included in the liquid crystal panel of the camera module.

With reference to FIG. 5, an example of the configuration of the liquid crystal panel PNL provided in the camera module CM will now be briefly described. Here, the light transmitting region (that is, the aperture portion OP) included in the liquid crystal panel PNL is mainly explained.

As shown in FIG. 5, the array substrate SUB1 includes an insulating layer 11, an insulating layer 12, an insulating layer 13, and the like between the insulating substrate 10 and the alignment film AL1. Further, on an outer side of the array substrate SUB1, the polarizer PL1 is formed.

The insulating layer 11 is provided on the insulating substrate 10. The insulating layer 12 is provided on the insulating layer 11.

Here, in FIG. 5, the first drive electrode E1 is provided on the insulating layer 12 and covered by the insulating layer 13. Further, the first drive electrode E2 is provided on the insulating layer 13 and covered by the alignment film AL1. The alignment film AL1 is in contact with the liquid crystal layer LC.

The first drive electrodes E1 and E2 are each formed of a transparent conductive material such as indium tin oxide (ITO), indium zinc oxide (IZO) or the like. In the example shown in FIG. 5, the insulating layer 13 is interposed between the first drive electrodes E1 and E2, but the first drive electrodes E1 and E2 may be formed in the same layer.

On the other hand, the counter substrate SUB2 includes a light-shielding layer BM, a transparent layer OC and an alignment film AL2 and the like on a side of the insulating substrate 20, which opposes the array substrate SUB1.

The light shielding layer BM is formed on an inner surface of the insulating substrate 20 so as to form light-shielding regions that compartmentalizes the first light transmitting region TA1 and the like, described above. The transparent layer OC covers the insulating substrate 20 and the light-shielding layer BM. The alignment film AL2 covers the transparent layer OC and is in contact with the liquid crystal layer LC.

The liquid crystal layer LC is driven by applying a voltage between the first drive electrodes E1 and E2. In this case, for example, a first voltage is applied to the first drive electrode E1 and a second voltage is applied to the first drive electrode E2 via the first pad P1 and the flexible circuit board FPC, which are located in a position overlapping the non-aperture portion OP, for example. Note that one of the first and second voltages has a voltage level of a positive polarity, for example, and the other has a negative polarity voltage level or common voltage Vcom.

Note that in this embodiment, for example, the liquid crystal layer LC is driven to transmit light to the image sensor IS through the first light transmitting region TA1 by applying a voltage between the first drive electrodes E1 and E2, and such driving of the liquid crystal layer LC is realized by the driver DR.

Here, for example, it is assumed that the transmission axes of the polarizers PL1 and PL2 are orthogonal to each other and the liquid crystal molecules contained in the liquid crystal layer LC are initially aligned in the direction of the transmission axis of the polarizer PL1 between the alignment films AL1 and AL2.

In this case, in the off state where no voltage is being applied between the first drive electrodes E1 and E2 (that is, the liquid crystal layer LC is not being driven), a phase difference does not occur in the liquid crystal layer LC and therefore the light transmittance in the first light transmitting region TA1 is minimal (that is, light cannot be transmitted through the first light transmitting region TA1).

On the other hand, in the on state where voltage is being applied between the first drive electrodes E1 and E2 (that is, the liquid crystal layer LC is being driven), the liquid crystal molecules are aligned in a direction different from the initial alignment direction and a phase difference is created in the liquid crystal layer LC, (in other words, light can be transmitted through the first light transmitting region TA1). Thus, the light transmitted through the first light transmitting region TA1 is made incident on the image sensor IS, and the camera module CM can capture images.

Here, it is assumed that the normally black mode, which does not transmit light in the off state, is employed in the liquid crystal panel PNL. But in this embodiment, the normally white mode, which does not transmit light in the on state (light is transmitted in the off state), may as well be employed.

In FIGS. 4 and 5 explained above, the first light transmitting region TA1 is mainly described, but the second and third light transmitting regions TA2 and TA3 should be configured in a manner similar to that of the first light transmitting region TA1 except that the position, size and shape in the aperture portion OP are different therefrom.

As described above, the camera module CM of this embodiment includes an image sensor IS and a liquid crystal panel PNL, and the liquid crystal panel PNL includes an aperture portion OP in which a plurality of light transmitting regions are formed, a liquid crystal layer LC disposed in a position overlapping the aperture, a plurality of drive electrodes disposed at positions respectively overlapping the plurality of light transmitting regions, a driver DR that drives the liquid crystal layer LC by applying a voltage to each of the plurality of drive electrodes, a non-aperture portion NOP that surrounds the aperture portion OP, and a plurality of pads that are arranged in positions overlapping the non-aperture portion NOP and electrically connect the plurality of drive electrodes and the driver DR to each other.

In this embodiment, with the configuration described above, it becomes possible to appropriately allow light to enter the image sensor IS through each of the plurality of light transmitting regions.

Note that in this embodiment, as shown in FIG. 2, it is explained on the assumption that the first to third pads P1 to P3 electrically connecting each of the first to third drive electrodes and the driver DR, which are arranged in positions overlapping the first to third light transmitting regions TA1 to TA3, respectively, extend along the direction Y (the second direction) and are disposed along the direction X (the first direction). But when the first to third pads P1 to P3 are arranged in this manner, the size (area) of the non-aperture NOP where the first to third pads P1 to P3 are arranged becomes larger. For example, if the size of the camera module CM (cover glass CG) in plan view is determined by design, the size of the non-opening area NOP becomes larger, the aperture portion OP must be reduced in size, and the amount of light incident on the image sensor IS through the aperture portion OP (the first to third light transmitting regions TA1 to TA3) is reduced. Since the information of light that does not enter the image sensor IS (blur) cannot be used for the calculation of the distance of a subject, a large size of the non-aperture area NOP (that is, reducing the aperture portion OP) is likely to affect the accuracy of the distance of a subject calculated from the image captured by the camera module CM (the image sensor IS).

The following is an explanation of a modified example of this embodiment, directed to the configuration for reducing the size of the non-aperture area NOP and securing an aperture portion OP of sufficient size.

Figure 6:
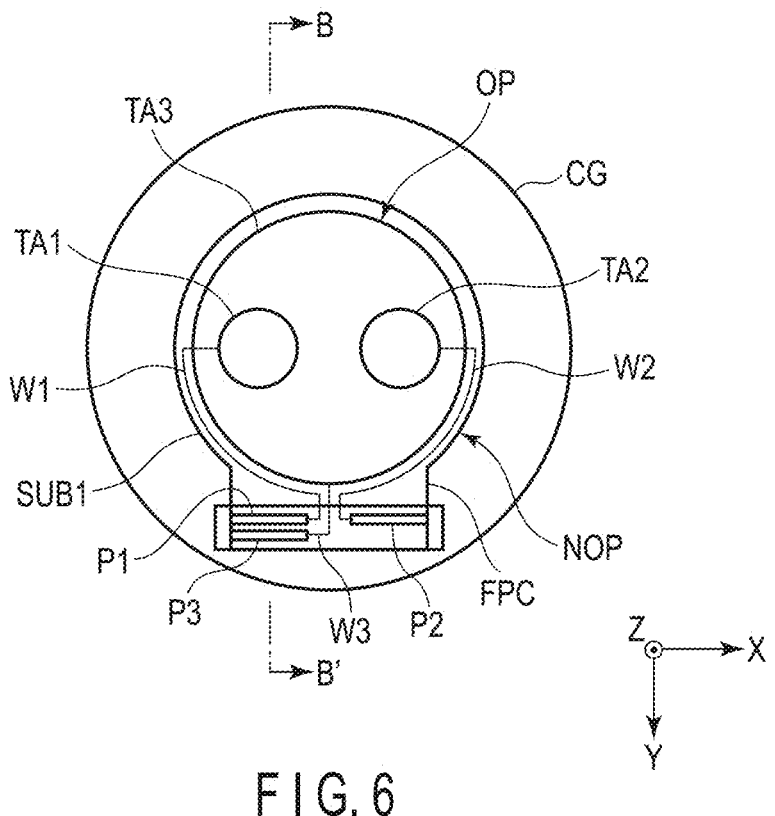
FIG. 6 is a diagram illustrating the first modified example of the embodiment.

FIG. 6 is a diagram illustrating the first modified example of this embodiment. In the example shown in FIG. 6, the first pad P1 and the second pad P2 extend along the direction X and are aligned along the direction X. Further, the third pad P3 extends along the direction X and is aligned with the first pad P1 along the direction Y.

In this case, the direction of mounting of the flexible circuit board FPC is rotated by 90° as compared to that of the flexible circuit board FPC described above in this embodiment, and extends along the first to third pads P1 to P3, (that is, in the direction X). According to this, the first pad P1 and the third pad P3 are electrically connected to the driver DR via the flexible circuit board FPC which is bent at the end portions of the first pad P1 and the third pad P3, on an opposite side to the direction X. On the other hand, the second pad P2 is electrically connected to the driver DR via the flexible circuit board FPC bent at the end portion of the second pad P2 on the side of the direction X.

Note that the aspect that the first to third pads P1 to P3 are electrically connected respectively to the first to third drive electrodes via the first to third wirings W1 to W3 is similar to that of this embodiment described above.

Figure 7:
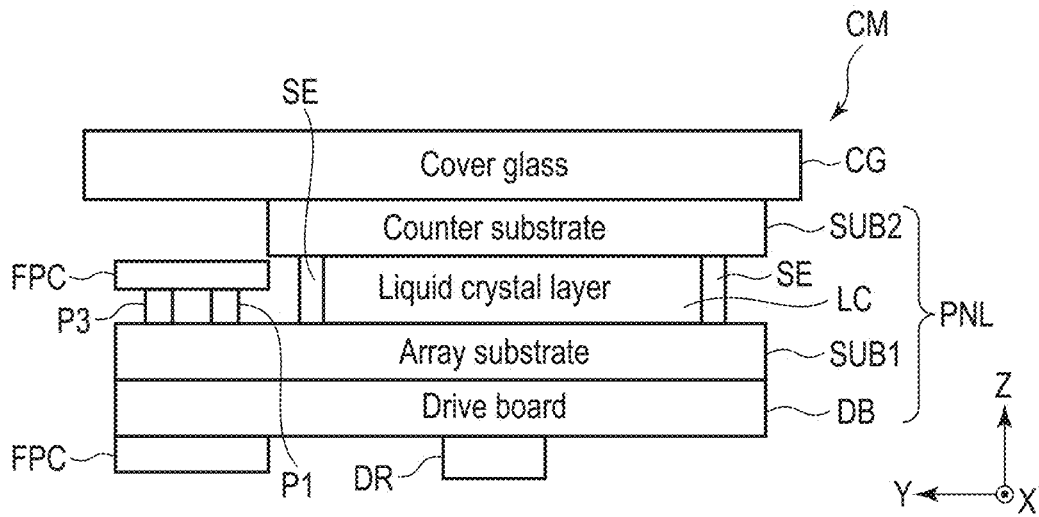
FIG. 7 is a cross-sectional view schematically showing the camera module taken along line B-B' in FIG. 6.

FIG. 7 is a diagram schematically showing a cross-section of the camera module CM, taken along line B-B' shown in FIG. 6. FIG. 7 illustrates that the first pad P1 and the third pad P3 extending along the direction X are aligned along the direction Y, and that the flexible circuit board FPC extending in the direction X so as to cover the first pad P1 and the third pad P3 is crimped to the first pad P1 and the third pad P3.

Further, in the embodiment described above, the flexible circuit board FPC is bent at the end portions of the first to third pads P1 to P3, which are the Y direction side. On the other hand, in the first modified example of this embodiment, the flexible circuit board FPC is bent at the end portions of the first pad P1 and the third pad P3 on the opposite side to the X direction as described above, and is bent at the end portion of the second pad P2 on the X-direction side.

As described above, in the first modified example of this embodiment, the non-aperture NOP can be reduced and the size of the aperture portion OP can be increased as compared to those of this embodiment, and thus the amount of light incident on the image sensor IS through the aperture portion OP can be increased and the accuracy of the distance of the subject calculated from the image based on the light can be improved. Further, in the first modified example of this embodiment, since the frame region (the region other than the aperture portion OP) in the camera module CM can be reduced, such an advantage of improving the appearance of the camera module CM (the electronic device equipped with the camera module CM) can be further obtained.

Figure 8:
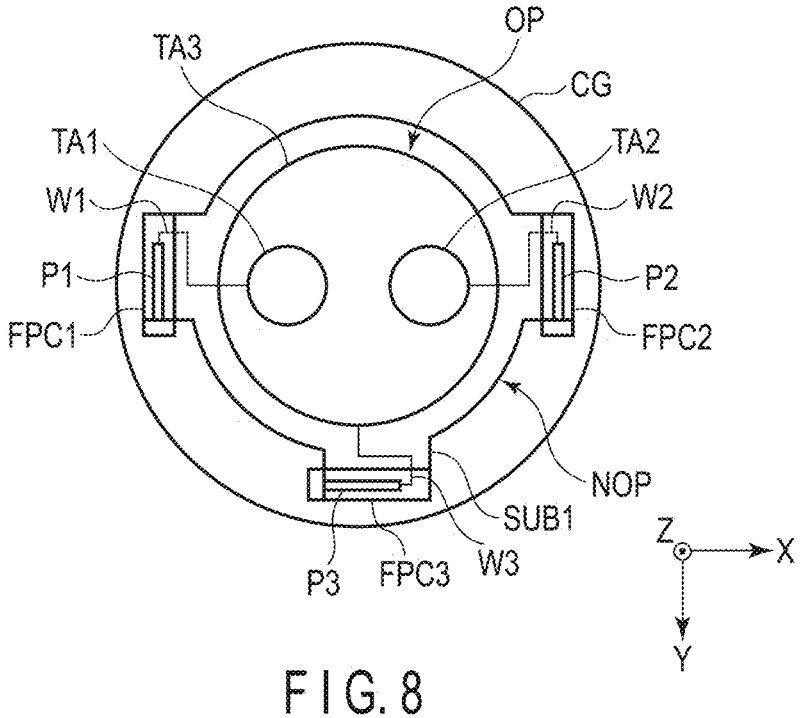
FIG. 8 is a diagram illustrating an example of the second modified example of the embodiment.

FIG. 8 is a diagram illustrating the second modified example of this embodiment. In the example shown in FIG. 8, the first to third pads P1 to P3 are disposed at dispersed positions respectively around the aperture portion OP. More specifically, for example, the first pad P1 and the second pad P2 are disposed at positions opposite to each other while interposing the aperture portion OP therebetween. Further, the third pad P3 is disposed at a position along the circumference of the aperture portion OP, which further corresponds to a middle position between the first pad P1 and the second pad P2.

In this embodiment and the first modified example of this embodiment described above, the array substrate SUB1 is described as having a keyhole shape, but the array substrate SUB1 in the second modified example of this embodiment has such a shape that a portion having a circular shape and three portions for disposing the first to third pads P1 to P3, respectively, are combined together.

Further, in the second modified example of this embodiment, the first to third pads P1 to P3 are disposed in dispersed positions, respectively, as described above, and therefore it is assumed that the first to third pads P1 to P3 are electrically connected to the driver DR via boards FPC 1 to FPC3 different from each other. Note that the boards FPC1 to FPC3 are assumed to extend in the direction along the first to third pads P1 to P3, respectively, and are bent at the longitudinal end portions of the pads.

As described above, in the second modified example of this embodiment, the size of the aperture portion OP can be increased as in the case of the first modified example, and thus the accuracy of the distance of the subject calculated from the image based on the light incident on the image sensor IS via the aperture portion OP can be improved.

In other words, when the aperture portion OP has a circular shape as described above, each pad should be disposed to be directed along a tangent line of the circular shape as in the first and second modified examples of this embodiment. With this configuration, the non-aperture NOP can be reduced in size and a larger sized aperture portion OP can be secured as compared to the configuration of this embodiment, (that is, the configuration in which the pads are disposed to be directed to intersect the tangent line).

Figure 9:
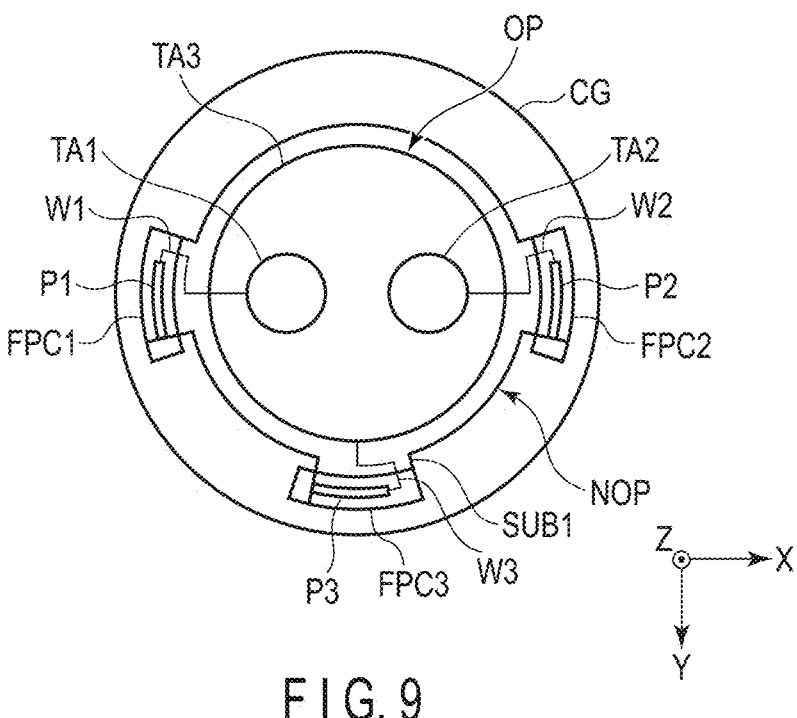
FIG. 9 is a diagram illustrating another example of the second modified example of the embodiment.

Note that in the second modified example of this embodiment, as shown in FIG. 9, the first to third pads P1 to P3 and the flexible circuit boards FPC1 to FPC3 may be formed into a shape along the circumference of the aperture portion OP (that is, an arc shape along the circular shape of the aperture portion OP). With this configuration, it is possible to further reduce the non-aperture NOP in size and allocate a larger sized area to the aperture portion OP.

In this embodiment, a plurality of drive electrodes are electrically connected to a driver DR located on the rear surface side of the array substrate SUB1 via a bendable flexible circuit board FPC, and thus the downsizing of the camera module CM is realized. But, for example, there are some cases where the frame area may become larger (that is, the aperture portion OP must be reduced), depending on, for example, the shape of the flexible circuit board FPC, (or the shape of the bend area).

For this reason, in each of the above-provided modified examples of this embodiment, the configuration for increasing the size of the aperture portion OP by changing the arrangement of the first to third pads P1 to P3 is described. But even when the first to third pads P1 to P3 are arranged in positions similar to those shown in FIG. 2, for example, there is a possibility that the size of the aperture portion OP can be increased by changing the shape of the flexible printed circuit board FPC as shown in FIG. 10.

Note that this embodiment and each of the modified examples of this embodiment are explained on the assumption that three light transmitting regions (first to third light transmitting regions TA1 to TA3) are formed in the aperture portion OP having a circular shape, but the shape of the aperture portion OP, the position, size, shape and number of light transmitting regions formed in the aperture portion OP, may be changed as needed according to, for example, the subject for which the distance is to be calculated as described above (that is, the environment in which the image is captured). Further, in this embodiment and each modified example of this embodiment, it is assumed that there is a plurality of light transmitting regions, but there may be only one such light transmitting region.

Second Embodiment

Next, the second embodiment will be described. In the following description, a detailed explanation of the same parts as those of the above-provided first embodiment will be omitted, and the parts that differ from those of the first embodiment will be mainly described. Further, the structural elements identical to those of the first embodiment provided above will be denoted by the same reference symbols as those used in the drawings described in the first embodiment.

In the first embodiment provided above, a configuration for increasing the size of the aperture portion OP by changing, for example, the arrangement of a plurality of pads for electrically connecting a plurality of drive electrodes to the driver DR is described. But, there is a possibility that the size of the aperture portion OP can be increased by decreasing the number of the plurality of pads.

Under these circumstances, in this embodiment, in order to increase the size of the aperture portion OP, for example, a configuration in which at least one pad (and its wiring line) of the plurality of pads is omitted is considered.

More specifically, for example, when a plurality of regions corresponding to the first to third light transmitting regions TA1 to TA3 (, which will be hereinafter referred to as the first to third regions TA1 to TA3) are formed in the aperture portion OP, the driver DR operates and drives the liquid crystal layer LC to allows light to pass through some of the plurality of regions (the first and second regions TA1 and TA2) (that is, to apply voltage to the first and second drive electrodes among the first to third drive electrodes disposed in the positions overlapping the first to third regions).

In such a case, the third drive electrode is connected to the common electrode Vcom, and therefore the third pad P3 for connecting the third drive electrode to the driver DR can be omitted. Note here that when the third pad P3 is omitted, voltage is not applied to the third drive electrode disposed in the position overlapping the third region TA3. For example, in the case where the liquid crystal panel PNL employs the normally black system, the third region TA3 is a region that always does not transmit light in this embodiment.

Here, as explained in the first embodiment provided above, for example, the accuracy of the distance can be improved by calculating the distance of the subject using multiple images based on the light transmitted through each of the multiple regions formed in the aperture portion OP, (that is, multiple blur patterns created based on the light transmitted through the regions). However, even if part of the plurality of regions (for example, the third region) is a region that always does not transmit light as described above, it is still possible to calculate the distance of the subject using, for example, a plurality of images based on the light made incident on the image sensor IS through each of the first and second regions TA1 and TA2.

More specifically, even in the case where the third region TA3 always does not transmit light as described above, voltage should be applied to the first and second drive electrodes in different patterns. In this manner, for example, a plurality of images including an image based on light transmitted through the first region TA1, an image based on light transmitted through the second region TA2, and an image based on light transmitted through both the first and second regions TA1 and T2 can be utilized to calculate the distance of the subject.

This embodiment can be applied to the above-described first embodiment and each of the modified examples of the first embodiment. For example, when this embodiment is applied to the first modified example of the first embodiment, the first pad P1 and second pad P2 can be arranged, for example, as shown in FIG. 11. In this manner, the number of signals (pads and wiring lines) can be reduced from three to two, thus making it possible to further increase the size of the aperture portion OP.

Note that it is assumed that even in the configuration where the third pad P3 is omitted as described above, the third drive electrode is disposed at the position overlapping the third region TA3.

Here, the configuration in which the third pad P3 is omitted is described, but such a configuration may as well do that the first pad P1 (and the first wiring line W1) or the second pad P2 (and the second wiring line W2) is omitted in place of the third pad P3. In addition, since a larger amount of light transmitted through the aperture portion OP (light transmitting region) is preferable for calculating the distance of the subject as described above, the pad connected to the drive electrode disposed in the position overlapping the light transmitting region having a smaller size (area) may be omitted.

Figure 12:
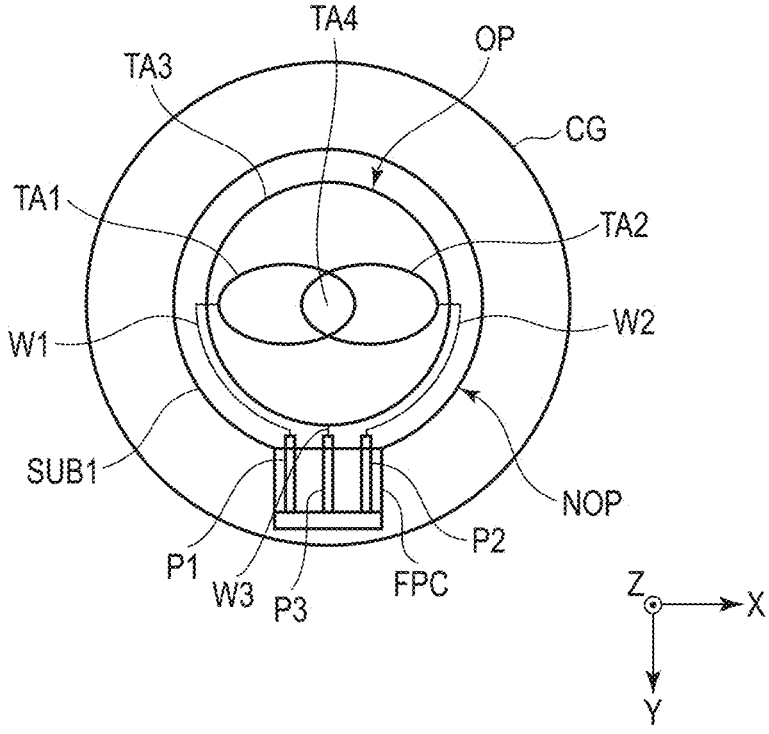
FIG. 12 is a plan view schematically showing another example of the camera module of this embodiment.

Moreover, although the case where three regions (the first to third regions TA1 to TA3) are formed in the aperture portion OP is described here, this embodiment can be applied even for the case where, for example, four regions (first to fourth regions TA1 to TA4) are formed in the aperture portion OP as shown in FIG. 12. In the example shown in FIG. 12, the fourth region TA4 is a region that always does not transmit light. With this configuration, even when the number of light transmitting regions is increased, for example, to calculate the distance of the subject with high accuracy, there is no need to increase the number of signal lines (pads and wiring lines) (that is, to enlarge the non-aperture NOP).

As described above, the camera module CM of this embodiment includes an image sensor IS and a liquid crystal panel PNL, and the liquid crystal panel PNL includes an aperture portion OP including a plurality of regions arranged in position where light is made incident on the image sensor IS, a liquid crystal layer LC disposed in a position overlapping the aperture portion, a plurality of drive electrodes disposed at positions overlapping the plurality of regions, respectively, a driver DR which drives the liquid crystal layer LC by applying a voltage to the drive electrodes disposed at positions overlapping some of the plurality of regions, a non-aperture portion NOP surrounding the aperture portion OP, and pads disposed in positions overlapping the non-aperture portion NOP and electrically connecting the drive electrodes to which voltage is applied and the driver DR. That is, in this embodiment, the region of those formed in the aperture NOP, where the pads for electrically connecting the driver DR are omitted (that is, the region overlapping the drive electrode connected to the common electrode Vcom) is an region that always does not transmit light.

In this embodiment, the number of pads disposed in the non-aperture area NOP can be reduced, thus making it possible to reduce the size of the non-aperture area NOP and increase the size of the aperture portion OP.

Here, the case where the liquid crystal panel PNL adopts the normally black mode is described, but the liquid crystal panel PNL may as well adopt the normally white mode. In this case, for example, when the third pad P3 (and the third wiring line W3) is omitted (that is, connected to the common electrode Vcom), the third region TA3 is a region that always transmits light. In such a case, by applying voltage to the first and second drive electrodes in different patterns, a plurality of images including an image based on the light transmitted through the first to third regions TA1 to TA3, an image based on the light transmitted through the first and third regions TA1 and TA3, and an image based on the light the second and third regions TA2 and TA3, can be utilized to calculate the distance of the subject.

All camera modules, which are implementable with arbitrary changes in design by a person of ordinary skill in the art based on the camera modules described above as the embodiments of the present invention, belong to the scope of the present invention as long as they encompass the spirit of the present invention.

Various modifications are easily conceivable within the category of the idea of the present invention by a person of ordinary skill in the art, and these modifications are also considered to belong to the scope of the present invention. For example, additions, deletions or changes in design of the constituent elements or additions, omissions or changes in condition of the processes may be arbitrarily made to the above embodiments by a person of ordinary skill in the art, and these modifications also fall within the scope of the present invention as long as they encompass the spirit of the present invention.

In addition, the other advantages of the aspects described in the above embodiments, which are obvious from the descriptions of the specification or which are arbitrarily conceivable by a person of ordinary skill in the art, are considered to be achievable by the present invention as a matter of course.

What is claimed is:

1. A camera module comprising:
an image sensor; and
a liquid crystal panel, wherein the liquid crystal panel including:
an aperture portion in which first and second regions are formed to be disposed in positions to allow light to enter the image sensor;
a liquid crystal layer disposed in a position overlapping the aperture portion;
a first electrode disposed in a position overlapping the first region and a second electrode disposed in a position overlapping the second region;
a driver which drives the liquid crystal layer by applying a voltage to each of the first and second electrodes;
a non-aperture portion which surrounds the aperture portion; and
a first pad that electrically connects the first electrode to the driver and a second pad that electrically connects the second electrode to the driver, the first and second pads being disposed in a position overlapping the non-aperture portion,
wherein the first and second pads are disposed at position opposing each other while interposing the aperture portion therebetween, the aperture portion has a circular shape, and the first and second pads have an arc shape along the circular shape of the aperture portion.

2. The camera module of claim 1, wherein the liquid crystal panel includes first and second substrates that hold the liquid crystal layer, and the first and second pads are formed on the first substrate and are electrically connected to the driver mounted on a drive board disposed on a rear surface of the first substrate via a flexible circuit board.

\* \* \* \* \*